United States Patent [19]

Allan

[11] 3,752,578
[45] Aug. 14, 1973

[54] MICROFILM TRANSPORT AND ENLARGER FOR MAKING PRINTS AND PLATES

[76] Inventor: Donald R. Allan, 650 Second St., Menlo Park, Calif. 94107

[22] Filed: Apr. 27, 1972

[21] Appl. No.: 248,029

[52] U.S. Cl. .................. 355/63, 355/41, 355/53
[51] Int. Cl. ........................................... G03b 27/56
[58] Field of Search ................ 355/41, 63, 53, 55, 355/18

[56] References Cited
UNITED STATES PATENTS

| 2,346,490 | 4/1944 | Huebner | 355/63 |
| 2,131,693 | 10/1938 | Smith | 355/63 X |
| 3,600,089 | 8/1971 | Walter | 355/41 X |
| 2,291,613 | 8/1942 | Dye | 355/63 X |
| 3,537,790 | 11/1970 | Ferguson | 355/41 |
| 3,592,114 | 7/1971 | Minett | 355/41 |

Primary Examiner—Samuel S. Matthews
Assistant Examiner—E. M. Bero
Attorney—Julian Caplan

[57] ABSTRACT

Microfilm is a source for exposure of sensitized paper or plate stock in an electrostatic copier, or other equipment, wherein light exposes light-sensitive material. The device has a base which may be mounted on the copier and a tower above the base carrying a housing. The film transport is motor driven from a supply reel to a take-up reel supported by the housing which has a film support hinged for access to the film for adjustment of the apparatus and to remove film. The transport has a light and photocell control of the winding motor so that marks on the film accurately position a selected frame relative to the optical axis of the lens and different channels or marks may be used selectively for control purposes. The transport and lens are mounted for movement along two horizontal axes and a vertical axis relative to the copier. The head contains an exposure lamp which is also adjustable in position. Vertical movement of the head relative to the tower governs the amount of enlargement of the microfilm frames.

11 Claims, 9 Drawing Figures

PATENTED AUG 14 1973

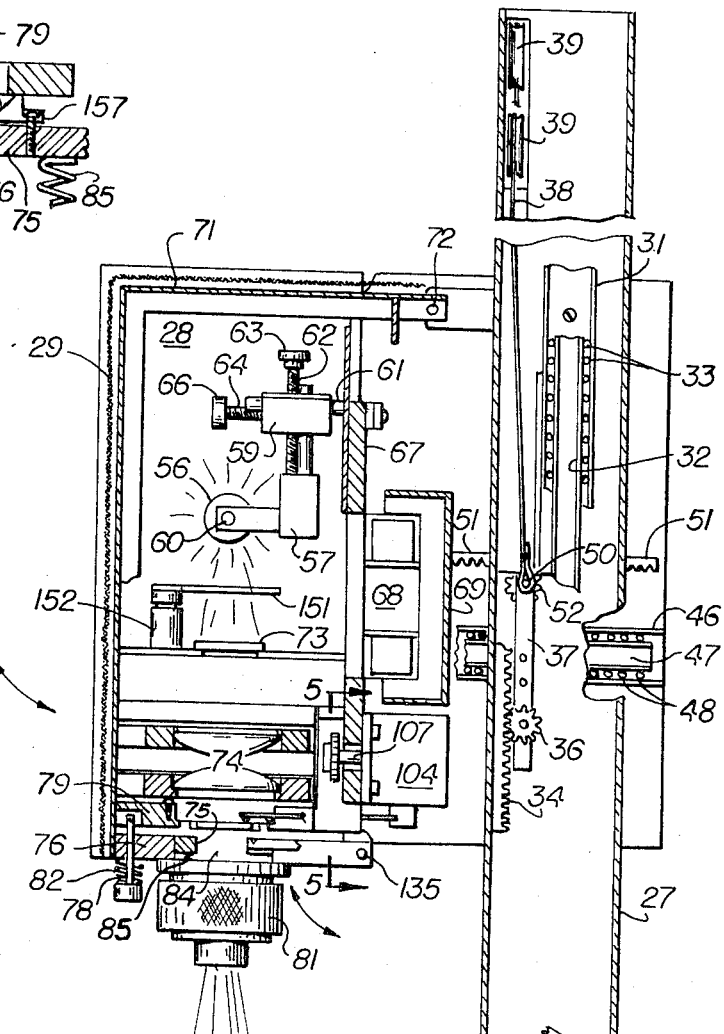
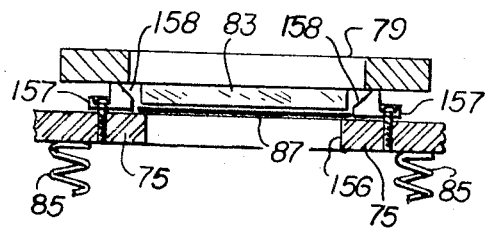
Fig. 9
Fig. 2
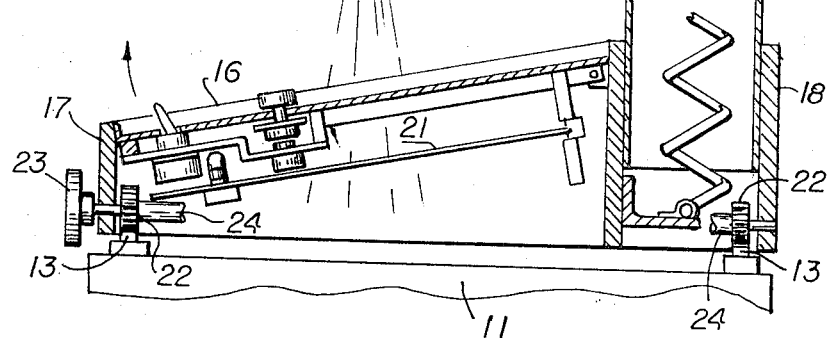
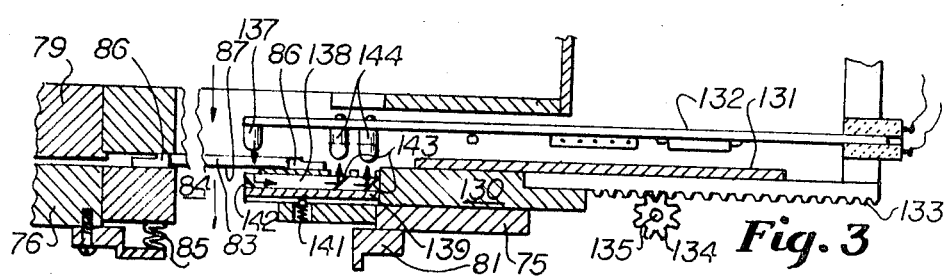
Fig. 3

… … …

MICROFILM TRANSPORT AND ENLARGER FOR MAKING PRINTS AND PLATES

This invention relates to a new and improved microfilm transport and enlarger for making prints and plates. More particularly, the invention relates to a device used to make plates and prints from data stored on microfilm and enlarged to full page (or part page) size and exposed on a sheet of photo-sensitive material.

In addition to conventional silver microfilm, other materials stored on reels such as diazo, thermo, and other vesicular films, may be used. The term "film" includes these sources of stored data. The transport of the copier may be used with various print and plate materials including precoated or uncoated papers which are direct image sensitive and which may be cut to size from a roll or otherwise severed to size or may be sheet fed. Typical examples are electrostatically charged paper, wood and plastic, all either precoated or uncoated. Photo-sensitive film and silver-coated paper, silver-coated direct image plate materials and other types of direct image plates may be used. Metal plates which are later etched may be produced. Printed circuit boards and micro-circuit devices may be produced with the invention. The system may be used with various copiers and may also be used in conjunction with developers positioned adjacent a copier. The term "paper" is used broadly to include various materials to be exposed by the transport of a copier or similar mechanism. The source film may be positive or negative and it may be perforated or imperforate, although desirably imperforate film is used.

A transport for the paper may be one which is commercially available. Reference is made to U.S. Pat. No. 3,634,006 which shows the use of an electrostatic copier such as the A. B. Dick Co. No. 675 Electrostatic Copier with certain parts removed. Alternatively, the corona charging and the developing functions of the A. B. Dick No. 675 Electrostatic Copier may be eliminated and the web feed mechanism and vacuum hold-down of that machine may be retained active for use in connection with silver-salt copying and adjacent to the machine a Kodalite film processor Model 324, sold by Eastman Kodak Company, may be installed. The specific machines mentioned herein are cited as typical and machines performing the same, or comparable, functions may be substituted.

The microfilm transport is controlled by marks exposed on the edge of the film in a preferred form of this invention. The mark first slows the machine; and then when the mark is accurately positioned relative to the exposure aperture, stops the transport of the film accurately centered relative to the optical axis of the enlarging lens and accurately centered relative to the paper in the copier. Further, several channels of marks may be used and the system may be adopted to be responsive to marks in any of the several channels on the film.

The machine may be used to enlarge individual selected frames or to enlarge each frame on a roll of film.

A particular feature of the invention is the fact that both the film and the paper are stationary at the time of exposure, thereby improving quality of reproduction.

A still further feature of the invention is its wide adjustability. Thus the housing of the enlarging mechanism and the microfilm transport may be moved longitudinally relative to the exposure bed of the copier. The housing may also be moved transversely relative to the copier, and thus both longitudinal and transverse adjustment of the exposure position may be accomplished. Further, the head may be moved vertically relative to the copier to adjust the amount of enlargement. The lens may be focused to insure a sharp image on the exposure bed of the copier. Finally, as has been mentioned, the positioning of the film may be adjusted by selecting channels of markings on the film.

A still further feature of the invention is the fact that the enlargement ratio is continuously variable in infinitely minute gradations so that the data on the microfilm may be exposed on the paper in a desired position either occupying the entire page, or any selected portion thereof, and the exposure pattern is accurately located in the desired position.

Other objects of the present invention will become apparent upon reading the following specification and referring to the accompanying drawings in which similar characters of reference represent corresponding parts in each of the several views.

In the drawings:

FIG. 2 is a vertical sectional view taken substantially along the line 2—2 of FIG. 1.

FIG. 3 is an enlarged fragmentary sectional view taken substantially along the line 3—3 of FIG. 1.

FIG. 9 is an enlarged fragmentary sectional view taken substantially along line 9—9 of FIG. 1.

The system of the present invention is installed on copier 11. One typical suitable copier is the A. B. Dick No. 675 Electrostatic Copier, modified as disclosed in U.S. Pat. No. 3,634,006. Reference is also made to a preceding part of this specification which discloses other means for transporting the paper and for processing the same after exposure. Copier 11 has a top opening 12 through which the paper (not shown) held on a vacuum bed is exposed. The paper is fed from a stock to a selected position and held in such position by vacuum for exposure, then moved to a developing, or other, station. The microfilm data is exposed on the paper while the latter is in position. It may be assumed the exposure position is directly under opening 12.

Figure 1:
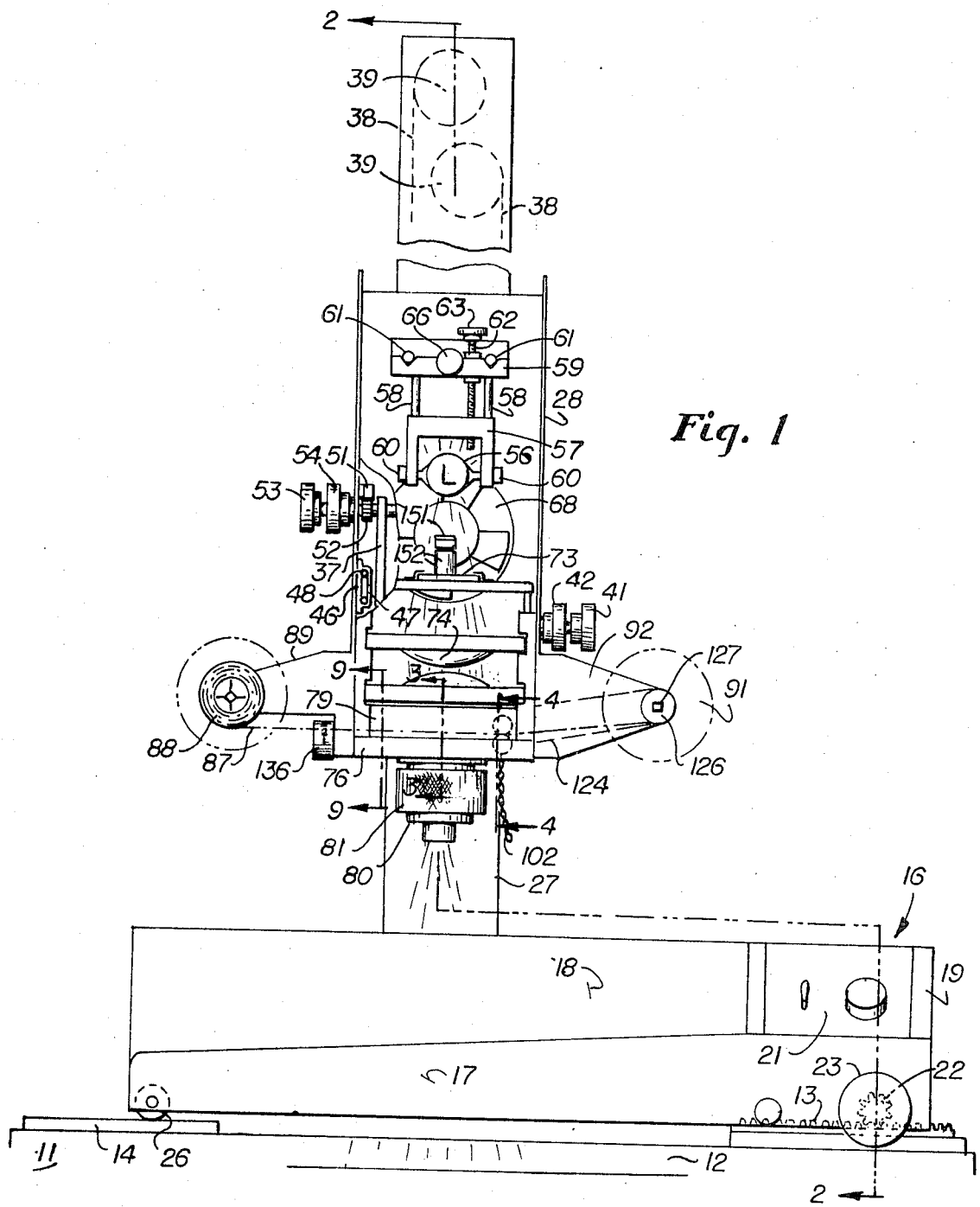
FIG. 1 is a front elevational view of the system partially broken away to reveal interior construction.
Figure 4:
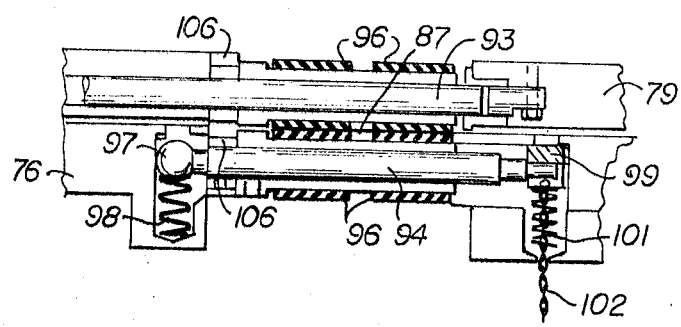
FIG. 4 is an enlarged sectional view taken substantially along the line 4—4 of FIG. 1.
Figure 8:
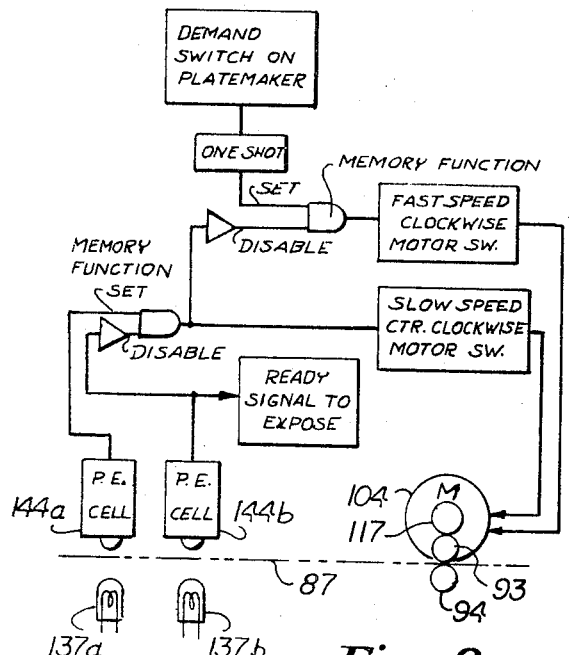
FIG. 8 is a schematic wiring diagram.
Figure 5:
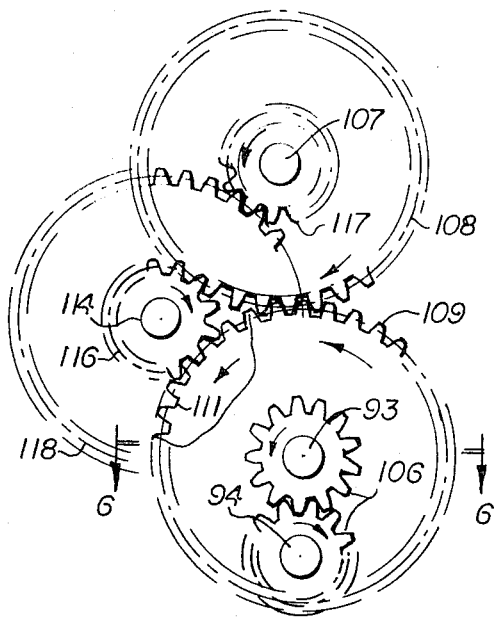
FIG. 5 is a schematic view showing the film advance gear drive.
Figure 6:
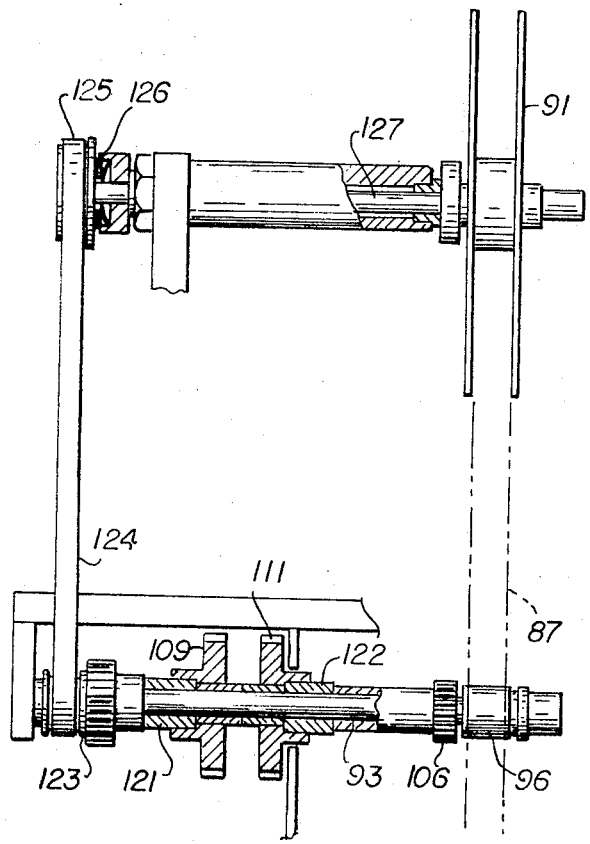
FIG. 6 is a sectional view taken substantially along the line 6—6 of FIG. 5.
Figure 7:
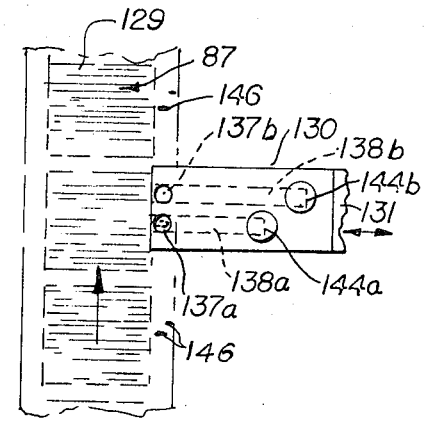
FIG. 7 is a plan view showing the photocell control for the sensing of microfilm markings.

Mounted at the right-hand end of the top of the copier, as viewed in FIG. 1 on the front and back thereof, are horizontal racks 13 spaced to one side of the opening 12. On the other side of the opening 12 are tracks 14. The film transport and enlargement portion of the system has a base 16 consisting of a longitudinally extending front 17 and back 18 before and behind opening 12. On one side of the opening 12 is side 19 containing electronic controls and printed circuit boards indicated generally by reference numeral 21. In plan, there is a wide space between the front 17 and back 18 and the side opposite side 19 is preferably left open thereby providing a large exposure area in the base.

At front and back within side 19 are pinions 22 mounted on transverse horizontal shaft 24 which is turned by knob 23 at the front of the machine. Pinions 22 engage racks 13; and hence by turning the knob 23, the base 16 may be moved longitudinally relative to the opening 12, the left-hand ends of the front 17 and back 18 being supported by rollers 26 which rest on tracks 14.

Mounted in and extending vertically above back 18 is a square cross-section, vertical hollow tower 27 which fits into a socket in the middle of back 18 and is slotted on the sides. Mounted for movement on and relative to tower 27 is a housing 28 having external screening 29. Housing 28 contains the microfilm transport, the enlarging lens and the enlarging lamp all hereinafter described in detail and is movable vertically and horizontally transversely relative to tower 27; and since tower 27 and the base 18 in which it is mounted are movable longitudinally relative to the copier 11, there is movement of the housing along three axes relative to opening 12.

To accomplish vertical movement of housing 28 relative to tower 27, vertical slide 31 is fixed adjacent either side of tower 27. Slideable relative to vertical slide 31 is an inner vertical slide 32, and balls 33 are interposed between the two slides much in the manner of a slide for a filing cabinet drawer. Slide 32 is fixed to frame member 37. Vertical rack 34 is fixed to the inside of front wall of tower 27 and is engaged by pinion 36 which is rotatably mounted in vertical frame member 37 of intermediate frame member 28 and extends out through slots in the sides of the tower. Cables 38 are attached to member 37 on either side of the tower 27 and run around spring counter-balance drums 39 mounted near the top of the tower. The drums assist in supporting the weight of the housing 28. Movement of the housing is accomplished by means of knob 41 connected to pinions 36, and clamp knob 42 secures the housing in properly adjusted position.

Horizontal transverse movement of housing 28 is supported by the interfitting of horizontal outer slide 46 which is fixed to housing 28 on the exterior of horizontal inner slide 47 which is fixed to frame member 37 with balls 48 interposed between the slides as in the case of slides 31, 32. Pinions 52 on shaft 50 which mesh with racks 41 fixed on opposite sides of tower 27 are rotatably mounted in member 37. On the exterior of housing 28 is knob 53 which turns pinions 52. Clamp knob 54 secures the housing in position after having been adjusted by knob 53.

Situated within housing 28 is a lamp 56 which may be of a mercury vapor or quartz iodide type for best definition but may also be incandescent or other type. Lamp 56 is secured within a yoke shaped socket 57 which is suitably apertured for vertical reciprocation along vertical slide rods 58 relative to top support member 59. Adjustment screws 60 threaded into the arms of socket 57 may be used to adjust the position of lamp 56 in a horizontal direction. Support member 59 is transversely horizontally slidable along horizontal slide rods 61 which are fixed to support 67 which is stationary within the housing. Vertical adjustment of lamp 56 is accomplished by threaded vertical adjustment shaft 62 having a knob 63 on one end and threaded at its other end into socket 57 so that by turning knob 63 the lamp 56 may be adjusted in vertical position. Similarly, horizontal adjusting shaft 64 having knob 66 is threaded into top support member 59 and rotatably fixed in support 67.

To cool the atmosphere surrounding lamp 56, a motor driven fan 68 is mounted below and to one side of the lamp and is surrounded by a light baffle 69. Further, to control the emission of stray light, a cover 71 is located within screening 29 of housing 28. To provide access to the interior of housing 28, the cover 71 is hinged by means of hinge pin 72 to a bracket on the housing and held open by any convenient means, such as a toggle arm.

Further to control the light emitted from lamp 56 a shutter 151 is interposed below lamp 60. Shutter 151 is mounted on the vertical shaft of rotary solenoid 152 and oscillates about said shaft and is spring biased into a position under lamp 60. When lamp 60 is energized, solenoid 152 is energized to pivot shutter 151 out of the way and when the lamp is de-energized the spring of the solenoid returns the shutter to blocking position.

Below lamp 56 and mounted in a suitable support is a filter glass 73 and below glass 73 are condenser lenses 74 mounted in lens holders which slide out of the housing 28 when the cover 71 is opened.

Below condenser lenses 74 is a lens supporting plate 76 which fits against the bottom 79 of housing 28. Plate 76 is hinged to bottom 79 by means hereinafter explained and is held in upward position by latch 78 of any conventional construction. By opening latch 78, access to the interior is obtained. Adjustably mounted relative to lens holding plate 76 for the purpose of focusing is lens focusing ring 81. Interchangeable lenses (not shown) enclosed in lens tubes 80 are focused by ring 81. To adjust the pressure of lens supporting plate 76 relative to bottom 79, there is a spring 82 associated with latch 78 which biases the plate 76 upward. The bottom 79 is cut away to provide a one-frame exposure aperture 156 for film 87 in line with the optical axis of lens 81 which is about the size of an individual frame 129 of the microfilm 87. The width of aperture 156 is slightly less than that of film 87 (see FIG. 9) so that the edges of the film are supported by plate 76. On either side of aperture 156 are side guides 157 fixed to plate 75. The spacing between guides 157 equals the width of film 87 with the close tolerances. The inner corners 158 are bevelled to facilitate entry of the film into place. A flat-bottom glass 83 is fixed to plate 79 by clips (not shown) to engage the top of film 87 and hold it flat ad properly located for sharp focus. Springs 85 bear against plate 76 (see FIG. 3) and against the underside of apertured plate 75 to hold guides 157 against the underside of bottom housing 79.

Film 87 is guided below glass 83 as it travels from a supply reel 88 which is rotatably mounted on the outer end of a bracket 89 attached to the left-hand side of housing 28, as viewed in FIG. 1, to a take-up reel 91 which is rotatably mounted on the outer end of bracket 92 on the opposite side of housing 28. Film 87, after passing under glass 83, is fed between upper and lower feed shafts 93, 94, respectively, which carry resilient feed rollers 96. The lower shaft 94 at one end has a ball 97 which is biased toward shaft 93 by spring 98. The opposite end of shaft 94 is received in a bearing 99 which is also biased toward shaft 93 by means of a spring 101. Chain 102 is fixed at its inner end to bearing 99; and when pulled downward, pulls the shaft 94 down away from shaft 93 with ball 97 as a fulcrum, creating a gap between the rollers 96 of the two shafts which facilitates threading of the microfilm 87.

Motor 104 drives the shafts 93, 94 which carry pinions 106 which mesh with each other to insure that the two shafts rotate together. Shaft 93 is the drive shaft and is driven at two different speeds by the same motor 104 depending upon the direction which the motor 104 runs. The photo-electric means whereby the motor 104 is reversed is hereinafter described. Motor shaft 107 carries a gear 108 which meshes with gear 109 which is connected to shaft 93 by means of a one-way clutch 121. Thus, when the motor 104 turns in one direction, shaft 93 turns at higher speed. When gear 109 turns in the opposite direction, the one-way clutch 121 is inoperative to turn shaft 93. Motor shaft 107 carries a second gear 117 of considerably smaller diameter than gear 108 and this meshes with gear 118 on cluster gear shaft 114. The latter shaft carries a pinion 116 which meshes with gear 111 which is connected through one-way clutch 122 to shaft 93. It will be noted that the use of idlers has reduced the speed ratio but has not reversed the direction of rotation of shaft 93.

To rewind film 87 on take-up reel 91, a sprocket 123 is fastened on shaft 93 to drive belt 124. Belt 124 turns pulley 125 which through slip clutch 126 turns shaft 127 of take-up reel 91. The use of clutch 126 permits shaft 127 to turn at proper speed to wind reel 91 regardless of the quantity of film on the reel.

Proper location of each frame 129 of microfilm 87 is by photo-electric means mounted on a slide 131 which moves transversely toward and away from the film 87 between bottom plate 76 and bottom 79 along the back edge of the film when viewed from the front of the machine. Slide 131 carries a printed circuit board 132 which contains certain electrical components, some of which are hereinafter described. Toward the back along the lower side of slide 131 is a rack 133 which meshes with a pinion 134. The shaft 135 of pinion 134 serves as a hinge pin for the lens holding plate 76. When latch 78 unlatches, plate 76 hinges around shaft 135 as a fulcrum. As is apparent, the position of slide 131 is adjustable transversely of the machine; but whatever its position when latch 78 is released, it returns to such position when the plate 76 is restored to horizontal position. Shaft 135 is turned by channel selector knob 136 on the side of the housing 28, the knob being used to designate the "channel" of markings 146 on each frame 129 of the film 87.

There are two adjacent bulbs 137, 138 on the inner end of printed circuit board 132 and these are positioned immediately above glass 83 and side by side longitudinally. Lucite, or other suitable material, is used to construct adjacent horizontal light paths 138a, 138b. The light paths 138 are securely held within a cavity in extension 130 of slide 131 by cover 139 which is biased by spring 141 attached to plate 76. There are 45° prisms on the ends of light paths 138a and 138b which received the light from the respective bulbs 137a, 137b and direct the light to the right as viewed in FIG. 3. There are second prisms 13 on the back ends of light paths 138a, 138b which direct the light upwardly to one or the other of the photocells 144a, 144b on printed circuit board 132.

There are markings 146 on the frames 129 of the film 87 and some of these markings are spaced inwardly from the edge of the film different distances than the others, the different distance intervals being termed "channels." Knob 136 is used to adjust the slide 131 so that the markings on a particular channel will be read by bulbs 137. When a mark 146 in the particular channel being read (as selected by knob 136) approaches a position under bulb 137a, it interrupts the path of light from that bulb through light path 138a to photocell 144a. Interruption of the light to cell 144a through a relay system causes motor 104 to reverse in direction, and, as heretofore explained, this causes the shafts 93, 94 to turn at a slower speed but in the same direction as they were previously turning at faster speed. When the same mark 146 then approaches the position so that it interrupts the light from the second bulb 137b to the photocell 144b, the motor 104 through electronic means is stopped, and the frame 129 is accurately positioned relative to aperture 84. The particular frame is then exposed by energizing bulb 56 and by opening shutter 151.

The sequence of operation is as follows: Knob 23 is used to adjust the base 16 so that the axis of lens 81 is precisely longitudinally adjusted to center on the aperture 12, or more precisely, upon the location of the paper which is fed onto a vacuum holding bed therebelow. Knob 53 is then turned so that the axis of lens 81 is transversely centered. Clamp knob 54 then is turned to clamp the knob 53 into position. The housing 28 is then elevated or depressed by turning knob 41 so that the size of the image of the microfilm frame is properly dimensioned on the paper after being exposed. Thereupon, knob 42 is turned to clamp the housing 28 in proper vertical position relative to tower 27. If necessary, the position of lamp 56 is adjusted by means of knobs 63 and 66, but this is not an adjustment which is frequently made. The lens 81 is then focused for a sharp image on the paper to be exposed. Finally, the channel selector knob 136 is turned to the proper channel, it being understood that only certain frames of the microfilm are ordinarily desired to be printed and the channel markings 146 assist in controlling which frames will be printed.

When the machine is properly set up, a starter button on control panel 21 is pushed and this causes the feed mechanism of the copier 11 to feed a sheet of paper into position immediately below opening 12. One means whereby this is accomplished is shown in U.S. Pat. No. 3,634,006. The paper is exposed to the corona if an electrostatic system is employed; or if a silver-salt system is being used, no corona is required. While the paper is being fed into position, the microfilm drive motor 104 is also energized, causing the shafts 93, 94 to drive the film 87 past the aperture 84. When a marking 146, which is in the channel which has been selected, approaches light path 138a in that channel it interrupts the light from bulb 137a to photocell 144a and this causes a reversal of direction of motor 104. This, in turn, causes the shaft 93 to turn at slow speed instead of high speed; and accordingly, when the mark 146 is immediately under the bulb 137b, the light to the photocell 144b is interrupted and the motor 104 is stopped. Thereupon, the lamp 56 is energized and shutter 151 is opened causing the particular frame 129, which is in position in aperture 84, to be exposed through lens 81 and focused on the paper. When this exposure has been timed by means forming no part of the present invention, the drive for the copier 11 is resumed and also the motor 104 is re-energized. While this is taking place, the exposed paper is processed to form a plate or print for reproduction. Only those frames 139 having marks 146 in the selected channel are printed.

What is claimed is:

1. A film transport and enlarger machine for making prints comprising a horizontally disposed casing having means to support light-sensitive material in horizontal position and formed with a first top opening through which said material is exposed, a base having a second opening, cooperating first means on said base and casing for moving said base parallel to said casing in a first direction, a tower mounted on and extending upward from said base, a housing, second means mounting said housing on said tower, third means for moving said housing relative to said tower in a second direction parallel to said base and transverse to said first direction, fourth means for moving said housing along said tower perpendicular to said base, an exposure light in said housing, an enlarging lens on the bottom of said housing above said second opening, a supply reel mounted on one side of said housing, a takeup reel mounted on the other side of said housing, a motor, a pair of film feed rolls driven by said motor to feed film from said supply reel to said takeup reel, guide means on said housing guiding film from said supply reel through said film rolls to said takeup reel, said guide means being between said light and said lens, a rewind drive for said takeup reel driven by said motor, and electrical means adjacent said guide means controlling said motor for accurately locating a selected frame of said film in line with the optical axis of said lens and in line with said light.

2. A machine according to claim 1 in which said first means comprises a rack and means mounting said rack on said casing and a pinion rotatable in said base meshing with said rack and means for turning said pinion.

3. A machine according to claim 1 in which said third means comprises cooperating horizontal slides one fixed on said tower and the other on said housing, a rack fixed to said housing, a pinion rotatable relative to said other slide and meshing with said rack, and means for turning said pinion.

4. A machine according to claim 1 in which said fourth means comprises cooperating vertical slides, one of said tower, the other fixed for movement with said housing.

5. A machine according to claim 4 in which said fourth means further comprises a rack fixed to said tower, and a rotatably mounted pinion movable with said housing meshing with said rack and means for turning said pinion.

6. A machine according to claim 1 in which said housing has a bottom opening and which further comprises a bottom plate on which said lens is mounted, and means pivotally mounting said plate relative to said housing to provide access through said bottom opening to at least a portion of said electrical means.

7. A machine according to claim 1 which further comprises a gear train for driving said film rolls from said motor, said electrical means including a lamp positioned at the edge of the path of film through said guide means to pass light from said lamp through the edge of film, a photocell, optical means including a reflecting surface establishing a path of light from said lamp through the edge of said film and to said photocell, and electrical components for stopping said motor when channel marks on said film interrupt transmission of light from said lamp to said photocell.

8. A machine according to claim 7 in which said housing has a bottom opening and which further comprises a bottom plate on which said lens is mounted, means pivotally mounting said plate relative to said housing to provide access through said bottom opening to at least a portion of said electrical means, said lens, said lamp, said photocell and said optical means.

9. A machine according to claim 7 which further comprises a slide mounted for transverse movement in said housing, an adjustment control for moving said photocell and lamp to different positions relative to the edge of said path of film, said holder mounted on said slide, whereby said photocell senses locating channel marks on said film at different distances from the edge of said film.

10. A machine according to claim 7 which further comprises a second photocell adjacent said first-mentioned photocell and spaced therefrom in the direction of movement of said film, and electrical means controlled by said second photocell to change the speed of movement of said film drive to slow speed when illumination of said second photocell is interrupted by said locating spot, whereby said second photocell senses said spot and slows film movement and said first-mentioned photocell senses said spot to accurately stop said film relative to said first aperture.

11. A transport according to claim 10 in which said motor is reversible and which further comprises a pair of one-direction clutches in said gear train, said second photocell reversing said motor and said clutches slowing rotation of said film drive.

* * * * *